United States Patent [19]

Nagai et al.

[11] Patent Number: 4,907,099
[45] Date of Patent: Mar. 6, 1990

[54] METHOD AND APPARATUS FOR REPRODUCING AN INFORMATION SIGNAL RECORDED ON A ROTARY RECORDING MEDIUM AT A HIGH SPEED

[75] Inventors: Tadao Nagai, Saganiko; Hiroaki Furuyama, Higashiyamato, both of Japan

[73] Assignee: Teac Corporation, Japan

[21] Appl. No.: 73,019

[22] Filed: Jul. 14, 1987

[30] Foreign Application Priority Data

Jul. 14, 1986 [JP] Japan .................................. 61-165222

[51] Int. Cl.⁴ .............................................. H04N 5/78
[52] U.S. Cl. ................................... 360/10.2; 358/312
[58] Field of Search .................. 360/8, 10.2, 10.1, 69, 360/75, 86; 369/44, 47; 358/310, 311, 312, 320, 321, 322

[56] References Cited

U.S. PATENT DOCUMENTS

4,425,587 1/1984 Kurata ................................. 360/10.1
4,429,335 1/1984 Sugiyama et al. .................. 360/10.1

Primary Examiner—Eugene R. Laroche
Assistant Examiner—Seung Ham
Attorney, Agent, or Firm—Andrus, Sceales, Starke & Sawall

[57] ABSTRACT

A method and apparatus for reproducing an information signal recorded on a disc at a high reproducing speed by moving a reproducing light beam for reproducing the information signal across a track along which the information signal is recorded one or a plurality of times one track pitch by one track pitch. The movement of the reproducing light beam is caused responsive to a driving signal produced for a predetermined number of times consecutively by reading out a table providing a relation between the desired reproducing speed and the number of times the reproducing light beam is to be moved.

3 Claims, 6 Drawing Sheets

METHOD AND APPARATUS FOR REPRODUCING AN INFORMATION SIGNAL RECORDED ON A ROTARY RECORDING MEDIUM AT A HIGH SPEED

BACKGROUND OF THE INVENTION

The present invention generally relates to methods and apparatus for reproducing an information signal recorded on a rotary recording medium at a high speed, and more particularly to a method and apparatus for reproducing a video signal recorded on an optical disc at a high reproducing speed by moving a light beam for reproducing the video signal across a track formed on the disc along which the video signal is recorded one or a plurality of times consecutively one track pitch by one track pitch.

Conventionally, there is a recording and reproducing apparatus for reproducing a video signal and an audio signal, recorded along a spiral or concentric track on an optical disc such as a video disc, by scanning the track by means of a light beam. Generally, the track of a video disc (referred to hereinafter as a disc) is divided into two through six portions. Usually, one field of a video signal constituting one frame of picture is recorded on one such portion. Thus, two successive track portions on a disc correspond to odd and even fields of the video signal. At a boundary between these two adjacent track portions is formed a vertical blanking interval recording region in which a vertical synchronizing signal is recorded. No video signal is recorded in this vertical blanking interval recording region. In a normal reproducing mode, the disc is rotated in a predetermined direction and the light beam traces the track as it moves across the recording area of the disc for example from an inner periphery thereof toward an outer periphery.

In such a recording and reproducing apparatus, there are instances that a user wishes to reproduce the recorded video signal at a high reproducing speed. Generally, in order to obtain high speed reproducing, it is necessary to reproduce an odd field video signal and an even field video signal which are separated from each other by a predetermined number of fields alternatively and consecutively. The aforementioned predetermined number of fields separating the odd and even fields are determined by the desired reproducing speed. Thus, it is necessary to move or jump the light beam from a first track portion on the disc in which odd (even) field information is recorded to a second track portion in which even (odd) field information is recorded. The second track portion aforementioned is separated from the first track portion by a predetermined number of tracks toward the outer or inner periphery of the disc responsive to the desired reproducing speed and a desired reproducing direction.

It is known that the one track pitch jump of the light beam across the disc repeated consecutively by (n−1) times during one revolution of the disc in a forward high speed reproducing mode results in a picture which is reproduced n times faster than the reproducing speed of the normal reproducing mode. Further, it is also known that the one track pitch jump of the light beam across the disc repeated consecutively by (n+1) times during one rotation of the disc in a backward high speed reproducing mode produces a picture reproduced n times faster than the reproducing speed of the normal reproducing operation.

In the high speed reproducing mode, no video signal is reproduced during the jump. As a result, a noise having a period of one to ten odds of H (H is a horizontal scanning interval) is produced. This noise appears on the screen as a horizontal line or a band. It is desirable, therefore, that such a noise is eliminated from the screen as much as possible by choosing the timing of the jump such that the jump is made during the vertical blanking interval.

In cases where the desired reproducing speed is relatively low such as twice the normal reproducing speed, the number of times the light beam is required to move or jump is relatively small, so that it is easy to confine the band shaped noise or a noise band in the vertical blanking interval therefore excluding the noise from the screen. However, as the desired reproducing speed increases to a relatively high speed such as a speed which is ten times faster than the normal reproducing speed, it becomes increasingly difficult to confine all of the jumps of the light beam within the vertical blanking interval. This is mainly due to the limitation imposed by the inertia of an actuator which causes the jump of the light beam. Thus, the aforementioned noise band appears on the screen and the quality of the reproduced picture is reduced.

Further, there is a problem in the conventional reproducing apparatus whereby the position of a noise band appearing on the screen in one field of the picture and the position of a noise band appearing in the succeeding field are not always identical. As a result, the area of the screen occupied by the noise band increases resulting in further deterioration of picture quality.

SUMMARY OF THE INVENTION

Accordingly, it is a general object of the present invention to provide a novel and useful method and apparatus for reproducing an information signal recorded on a rotary recording medium at a high speed wherein the problems aforementioned are eliminated.

Another and more specific object of the present invention is to provide a method and apparatus for reproducing an information signal recorded on a rotary recording medium at a high speed by moving reproducing means for reproducing the information signal recorded on the disc across a track on the disc, along which the information signal is recorded, consecutively one or a plurality of times one track pitch by one track pitch, wherein a relation between the reproducing speed and corresponding number of times the reproducing means is to be moved across the track consecutively one track pitch by one track pitch during one rotation of the rotary recording medium, is stored in memory means in a form of a table, the apparatus reading out the number of times the reproducing means is to be moved in order to obtain a desired reproducing speed and a desired reproducing direction from the memory means in response to a high speed reproducing command signal commanding the desired reproducing speed and the desired reproducing direction, and moving the reproducing means consecutively one or a plurality of times one track pitch by one track pitch across the track in response to the number of times the reproducing means is to be moved as read from the memory means in a relatively confined time interval including a vertical blanking interval in such a manner that the one or a plurality of movements of the reproducing means are made with a predetermined timing relative to a timing of a vertical synchronizing pulse. According to the present invention, a band shaped noise or noise band caused by the one or a plurality of the movement of the reproducing means across the tracks during the high speed reproducing operation can be eliminated from a display screen of an information reproducing system or at least can be confined to an upper or lower portion of the screen even in such cases where the reproducing speed is very high. Thus, the effect of the noise band on the quality of the picture is minimized. Further, it becomes possible to position the noise band on the screen so that a noise band during an odd field of the information signal and a noise band during an even field of the information signal are located in the same position. Thus, the deteriorative effect due to the area of the noise band occupying the screen is reduced.

Other objects and further features of the present invention will be apparent from the following description when read in conjunction with the attached drawings.

DETAILED DESCRIPTION

Figure 1:
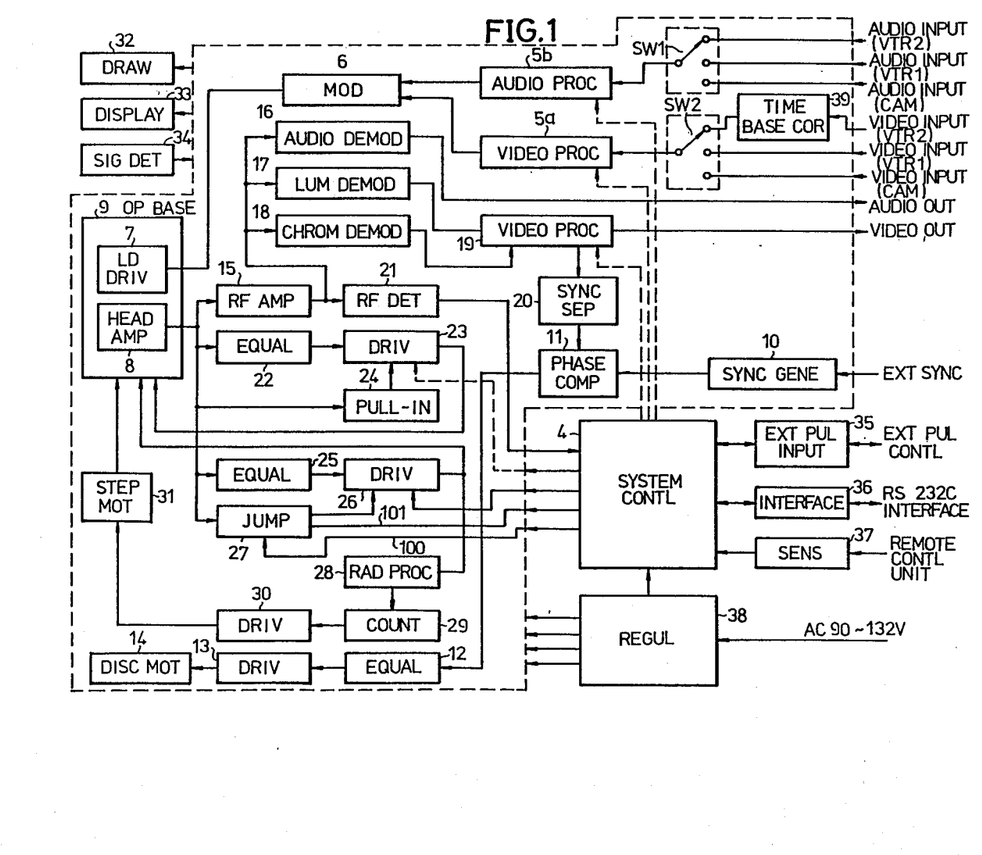
FIG. 1 is a system block diagram showing an embodiment of a disc recording and reproducing apparatus to which the present invention may be applied.
Figure 2:
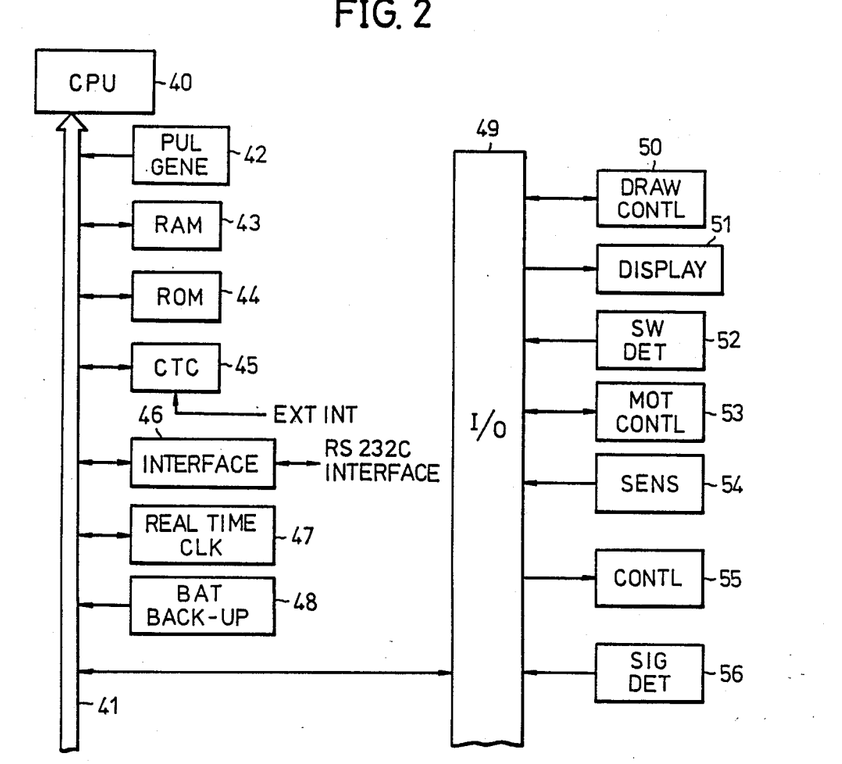
FIG. 2 is a system block diagram showing an embodiment of an essential part of the block system shown in FIG. 1.

FIG. 1 shows an embodiment of a disc recording and reproducing apparatus to which the method and apparatus according to the present invention may be applied. In other words, it may be regarded that FIG. 1 shows an embodiment of the present invention. FIG. 2 shows an embodiment of an essential part including a system controller of the apparatus shown in FIG. 1.

First, a general description will be given on the disc recording and reproducing apparatus to which the present invention may be applied by referring to FIGS. 1 and 2. In a recording mode, an input video signal is obtained from one of a first video tape recorder VTR1, a second video tape recorder VTR2 and a camera via a time base corrector 39 by selecting a connecting position of a switch SW1, and an input audio signal is obtained from a corresponding one of the first video tape recorder VTR1, the second video tape recorder VTR2 and the camera by selecting a connecting position o a switch SW2. The input video signal is supplied to a modulator 6 via a video signal processor 5a, while the input audio signal is supplied to the modulator via an audio signal processor 5b. The processed input video and audio signals are modulated into a signal having a predetermined signal format in the modulator 6. A modulated signal from the modulator 6 is supplied to a laser diode (not shown) via a laser diode (LD) driver 7 so as to control the intensity of light emitted from the laser diode depending on the information contents of the modulated signal. The light from the laser diode is irradiated on an optical disc (not shown) which is used as an example of the information recording medium, to record the modulated signal on the optical disc.

The optical disc is rotated by a disc motor 14 to undergo a synchronous rotation. The disc motor 14 is controlled by a control signal which is derived from an external synchronizing signal. A circuit comprising a synchronizing signal generator 10, a phase comparator 11, an equalizer 12 and a driver 13 generates the control signal from the external synchronizing signal. The LD driver 7 is mounted on an optical base 9 together with a head amplifier 8, and the optical base 9 is fed in a predetermined direction by a stepping motor 31 in the recording mode.

In a reproducing mode, a reproduced RF signal is obtained by detecting the change in the intensity of light reflected from the optical disc by scanning the optical disc by a main light beam. The reproduced RF signal is passed through the head amplifier 8 and an RF signal amplifier 15. The reproduced RF signal obtained via the RF signal amplifier 15 is supplied to an audio signal demodulator 16, a luminance signal demodulator 17 and a carrier chrominance signal (color signal) demodulator 18. A reproduced luminance signal from the luminance signal demodulator 17 and a reproduced carrier demodulator 18 are supplied to a video signal processor 19 wherein the reproduced signals are converted into a reproduced color video signal having a predetermined signal format. A synchronizing signal separator 20 separates a synchronizing signal from a signal which is obtained from the video signal processor 19. The synchronizing signal from the synchronizing signal separator 20 is supplied to the phase comparator 11.

The reproduced RF signal obtained via the RF signal amplifier 15 is supplied to an RF signal detecting circuit 21 which detects the RF signal, and an output detection signal of the RF signal detecting circuit 21 is supplied to a system controller 4. A signal which is obtained by detecting the change in the intensity of light reflected from the optical disc by scanning the optical disc by sub light beams different from the main light beam is also obtained from the head amplifier 8. This signal from the head amplifier 8 is supplied to a focus servo circuit constituted by an equalizer 22, a driver 23 and a pull-in circuit 24. The focus servo circuit produces a focus servo signal for controlling the focus so that the main light beam hits the optical disc in focus, and this focus servo signal is supplied to the optical base 9. The pull-in circuit 24 operates when pulling in the focus servo circuit. In other words, the driver 23 is excited in a predetermined period when the focus servo operation is carried out in a closed loop, and the pull-in circuit 24 is used to detect the peaks in the output of the head amplifier 8 and stop the excitation when carrying out the focus servo in the closed loop.

In the present embodiment, the optical base 9 constitutes a part of an optical recording and reproducing means for recording and reproducing a signal on and from the optical disc by use of the light beams.

The output signal of the head amplifier 8 is also supplied to a tracking servo circuit constituted by an equalizer 25, a driver 26 and a jump circuit 27. The tracking servo circuit produces a tracking error signal which is supplied to the optical base 9 for controlling the tracking. The tracking servo circuit and the focus servo circuit described before are used not only in the reproducing mode but also in the recording mode.

The output signal of the driver 26 is also supplied to the stepping motor 31 via a radial processing circuit 28, a counter 29 and a driver 30, so as to control the rotation of the stepping motor 31. The radial processing circuit 28 drives the stepping motor 31 to move the entire optical base 9 along a radial direction of the optical disc when the output voltage of the driver 26 exceeds a redetermined level. This output voltage of the driver 26 is used to drive a rotary mirror (not shown) of the optical base 9. As a result, the rotary mirror is always controlled about its neutral position.

A drawer part 32 lowers a disc tray (not shown) for the optical disc responsive to a signal from a circuit part indicated by a phantom line in FIG. 1 when the signal detector 34 for detecting various signals detects that the disc tray is closed. The optical disc on the lowered disc tray is placed on a turntable (not shown) and clamped thereon. On the other hand, when the signal detector 34 detects that an eject switch (not shown) is turned ON, the drawer part 32 raises the disc tray responsive to a signal from the circuit part so as to eject the optical disc from the apparatus. Various modes of the apparatus and the like are displayed on a display device 33.

A regulator 38 supplies D.C. power source voltages to various parts (circuit part) of the apparatus indicated by the phantom line in FIG. 1. The system controller 4 is also supplied with signals from an external pulse input part 35, an interface 36 and a sensor 37.

As shown in FIG. 2, the system controller 4 comprises a central processing unit (CPU) 40, and a pulse generator 42, a random access memory (RAM) 43, a read only memory (ROM) 44, a counter timer circuit (CTC) 45, and interface 46 corresponding to the interface 36 shown in FIG. 1, a real time clock 467, a battery back-up 48 and an input/output (I/O) device 49 which are respectively coupled to the CPU 40 via a bus line 41. The pulse generator 42 generates various pulses including system reset pulses and a system clock pulses. The CTC 45 comprises a counter and a timer for generating an interrupt. The real time clock 47 generates calendar clock pulses for the year, month, day hour, minute and second.

The I/O device 49 is coupled to a drawer controller 50 for controlling the drawer part 32, a display part 51, a switch detector 52, a controller 53 for controlling the stepping motor 31, a remote control sensor 54 corresponding to the sensor 37, a controller 55, and a signal detector 56 which corresponds to the signal detector 34.

In FIG. 2, the drawer controller 50 constitutes a part of the drawer part 32, and the display part 51 constitutes a part of the display device 33 shown in FIG. 1. In addition, the switch detector 52, the remote control sensor 54 and the signal detector 56 constitute a part of the signal detector 34. Other remaining parts shown in FIG. 2 substantially constitute the system controller 4. A known integrated circuit chip Z80 may be used for the CPU 40 shown in FIG. 2.

Next, a description will be given on an embodiment of the present invention. The optical base 9 in FIG. 1 carries the laser diode LD for reproducing information signals recorded on the optical disc along a track in a spiral form. The optical base 9 scans the optical disc along the track by means of the main and sub light beams aforementioned. In the following descriptions, the main and sub light beams are referred to as reproducing light beams. When reproducing the video signal at a high speed, the reproducing light beams are moved or jumped across the track toward an inner or outer periphery of the disc consecutively one track pitch by one track pitch a number of times by actuating the aforementioned rotary mirror responsive to a high speed reproducing command signal supplied to the system controller 4 externally via the interface 36 or the sensor 37. In a recording and reproducing apparatus designed to move the reproducing light beams from the inner periphery of the disc toward the outer periphery in its normal reproducing mode, the reproducing light beams jump across the track toward the outer periphery of the disc when a high speed reproducing is desired in a forward direction, while the reproducing light beams jump across the track toward the inner periphery of the disc when the desired high speed reproducing is to be carried out in a backward direction.

Figure 3:
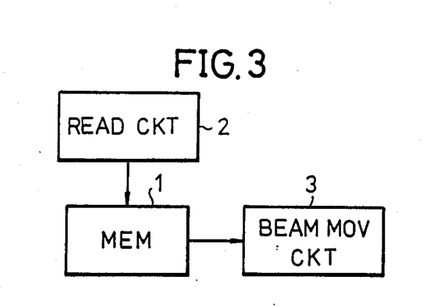
FIG. 3 is a schematic system block diagram showing an embodiment of a high speed reproducing apparatus according to the present invention.
Figure 4:
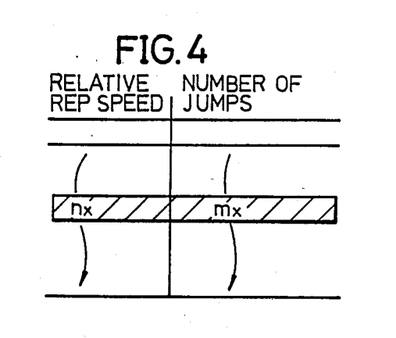
FIG. 4 is a diagram showing a structure of a table stored in a memory shown in FIG. 3.

FIG. 3 is a schematic system block diagram of an embodiment of the present invention for performing the operation aforementioned. In the drawing, a memory 1 corresponds to the ROM 44 in the system controller 4 and stores a table of a number of times the optical beams are to be jumped across the track responsive to a high reproducing speed commanded by the high speed reproducing command signal. FIG. 4 shows an example of a structure of this table. As can seen from the drawing, the table stores a combination of a number of jumps $m_x$ which represents the number of times the reproducing light beam jumps during one revolution of the disc and a corresponding reproducing speed ratio $n_x$ which is a ratio of the desired high reproducing speed relative to the normal reproducing speed. The speed ratio $n_x$ and the number of jumps $m_x$ are read from the memory 1 which is identical to the ROM 44 by a reading circuit 2 constituted by the CPU 40. The CPU 40, servo controller 55, jump circuit 27 and the driver 26 constitute a beam moving circuit 3. The beam moving circuit 3 discriminates whether the desired reproducing direction is a forward direction or a backward direction and causes the jump of the reproducing light beam toward the inner periphery of the disc or toward the outer periphery of the disc by producing one or a plurality of jump pulses having a polarity corresponding to the desired reproducing direction with a predetermined timing.

Figure 5:
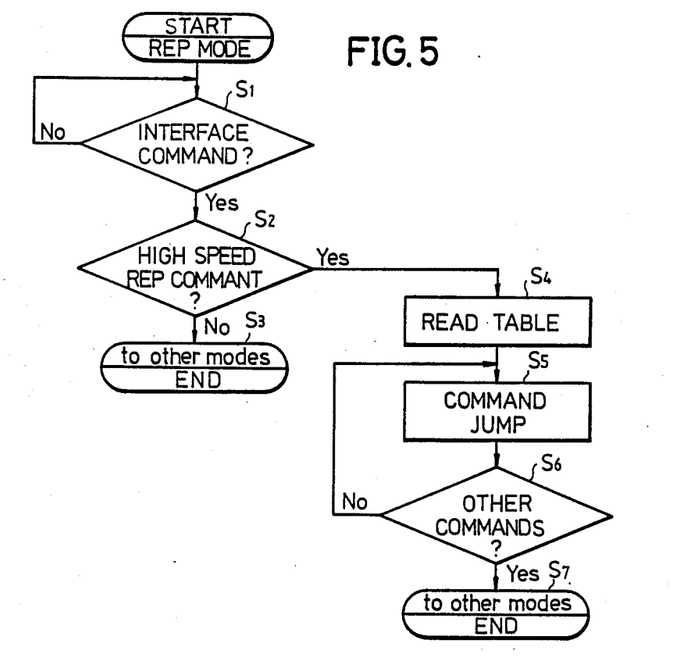
FIG. 5 is a flow chart for explaining the operation of the apparatus in FIG. 3.

Next, the operation of the apparatus shown in FIG. 3 will be described in detail with reference to FIGS. 5 and 6 which show the flow charts explaining the operation of the CPU 40. Referring to FIG. 5, the recording and reproducing apparatus in FIG. 1 is operated with the reproducing mode. At a step S1, the CPU 40 monitors the appearance of a command signal to be supplied to the system controller 4 at the interface 36 or the sensor 37. In case a command signal is applied to the system controller 4 via the remote control key sensor 37 or the interface 36, the CPU 40 discriminates whether the input command signal is the high speed reproducing command signal or not in a step S2. In case the input command signal is not the high speed reproducing command signal, the CPU 40 carries out other operations commanded by the input command signal in a step S3.

In case the input command signal is the high speed reproducing command signal, the CPU 40 carries out the operations of steps S4 and S5. In the step S4, the CPU 40 discriminates the desired reproducing speed selected by an user of the recording and reproducing apparatus on the basis of the input high speed reproducing command signal and reads out the number of jumps $m_x$ corresponding to the speed ratio $n_x$ determined by the desired high reproducing speed indicated by the user. In the step S5, the CPU 40 discriminates the desired reproducing direction selected by the user on the basis of the input high speed reproducing command signal and produces a first and second trigger pulses one or a plurality of times according to the number of jumps $m_x$ in the table and transmits them to the jump circuit 27 in FIG. 3 through the bus 41, I/O device 49, servo controller 55 and the lines 100 and 101. The jump circuit 27 produces a jump pulse responsive to the first and second trigger pulses and causes the jump of the reproducing light beam by one track pitch which is repeated one or a plurality of times in accordance with the number of jumps $m_x$.

The jumps are made in a relatively confined time interval including a vertical blanking interval which includes the vertical synchronizing signal in such a manner that each of the jumps are made with predetermined relations to the vertical blanking signal. The polarity of the jump pulse corresponds to the polarity of the first and second trigger pulses and determines the direction of the jump. The jump pulse is supplied to the tracking actuator (not shown) in the optical base 9 via the driver 26. In response to the individual jump pulse, the actuator drives the rotary mirror in the optical base 9 to cause the jump of the reproducing light beams.

Thus, the jump pulse controls the actuator to cause the jump of the reproducing light beams one or a plurality of times consecutively one track pitch by one track pitch across the track in a relatively confined time interval including the vertical blanking interval. As a result, all of the jumps of the reproducing light beam are made in the confined time interval including the vertical blanking interval and a desired movement of the reproducing light beam is achieved.

The reading circuit 2 in FIG. 3 for carrying out the operation of the step S4 comprises a part of the CPU 40, and the beam moving circuit 3 for carrying out the operation of the step S5 comprises another part of the CPU 40, jump circuit 27 and the driver 26.

In a step S6, the CPU 40 continues the jump aforementioned until other command signal is supplied to the system controller 4. Thus, the high speed reproducing operation is repeated until another command signal is supplied. When another command signal is supplied in a step S7, the CPU 40 produces a control signal for switching the operation mode of the recording and reproducing apparatus from the high speed reproducing mode to another mode commanded by the input command signal and the high reproducing operation is ended.

Figure 6:
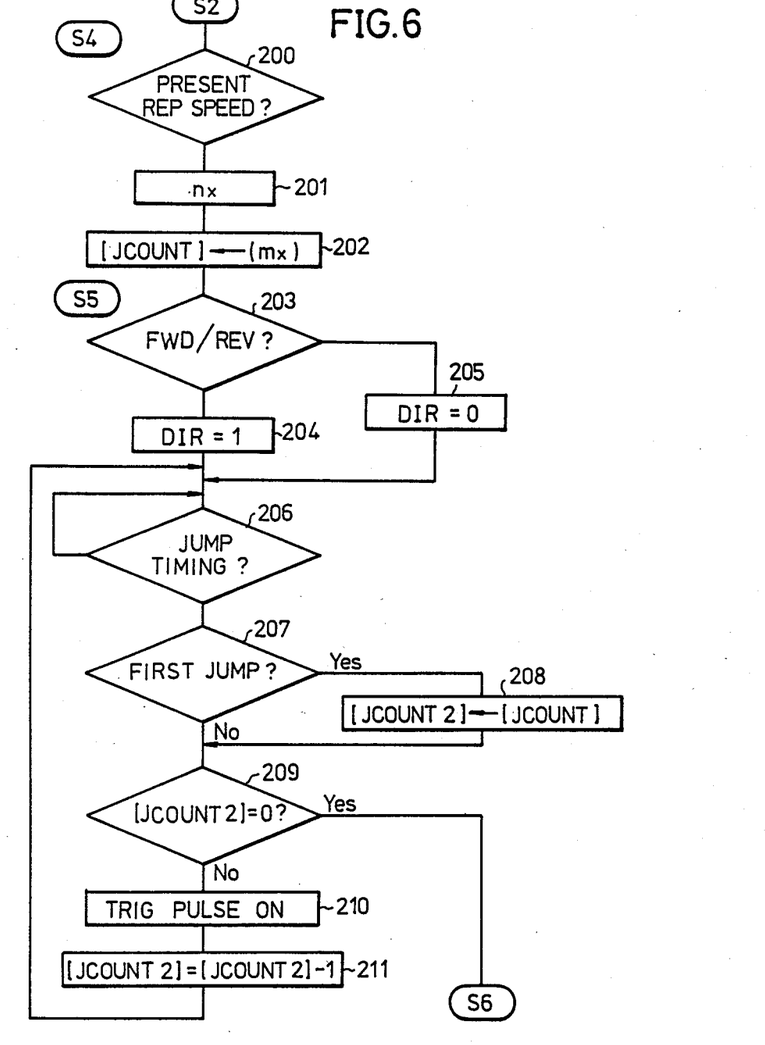
FIG. 6 is a flow chart for explaining a part of the flow chart in FIG. 5 in more detail.

FIG. 6 is a flow chart showing the operations carried out in the steps S4 and S5 in more detail. In a step 200, the high speed reproducing speed selected by the user is discriminated on the basis of the input high speed reproducing command signal. In a step 201, the speed ratio $n_x$ is obtained by dividing the desired high speed reproducing speed by the normal reproducing speed. In a step 202, the number of jumps $m_x$ corresponding to the speed ratio $n_x$ is read out from the table in the ROM 44 and is stored in a suitable location in the RAM 43 temporarily as a parameter JCOUNT. Thus, the number of jumps $m_x$ is substituted into the parameter JCOUNT. In a step 203, a discrimination is made whether the desired reproducing direction is the forward direction or backward direction on the basis of the high speed reproducing command signal. In case, the desired reproducing direction is the forward direction, a parameter DIR is set to one in a step 204, while in case the desired reproducing direction is the backward direction, the parameter DIR is set to zero in a step 205. The direction of the jump toward the inner periphery or outer periphery of the disc is determined by the value of the parameter DIR as will be described later. In a step 206, a timing of the jump is determined relative to the timing of the vertical synchronizing signal, and the timing thus determined is sent to the CPU 40. The timing of the jumps will be described in detail with reference to FIG. 7 in later. In a step 207, a discrimination is made whether the jump to be made is the first jump in the frame or not. If YES, the value of the parameter JCOUNT is substituted into another parameter JCOUNT2 in the RAM 43 and the operation of the CPU 40 proceeds to a step 209. In case the result of the discrimination in the step 207 is NO, the operation of the CPU 40 proceeds directly from the step 207 to the step 209. In the step 209, a discrimination is made whether the value of the parameter JCOUNT2 is zero or not. If YES, the the CPU 40 proceeds to a step 210 and produces the jump pulse for the first and second fields with the timing as determined by the step 206. In a step 211, the value of the JCOUNT2 is subtracted by a value one (JCOUNT2−1) and the value thus obtained is substituted to the parameter JCOUNT2. Then, a step to loop back to the step 206 is carried out and the operation aforementioned is repeated until the value of the JCOUNT2 becomes zero.

Figure 7:
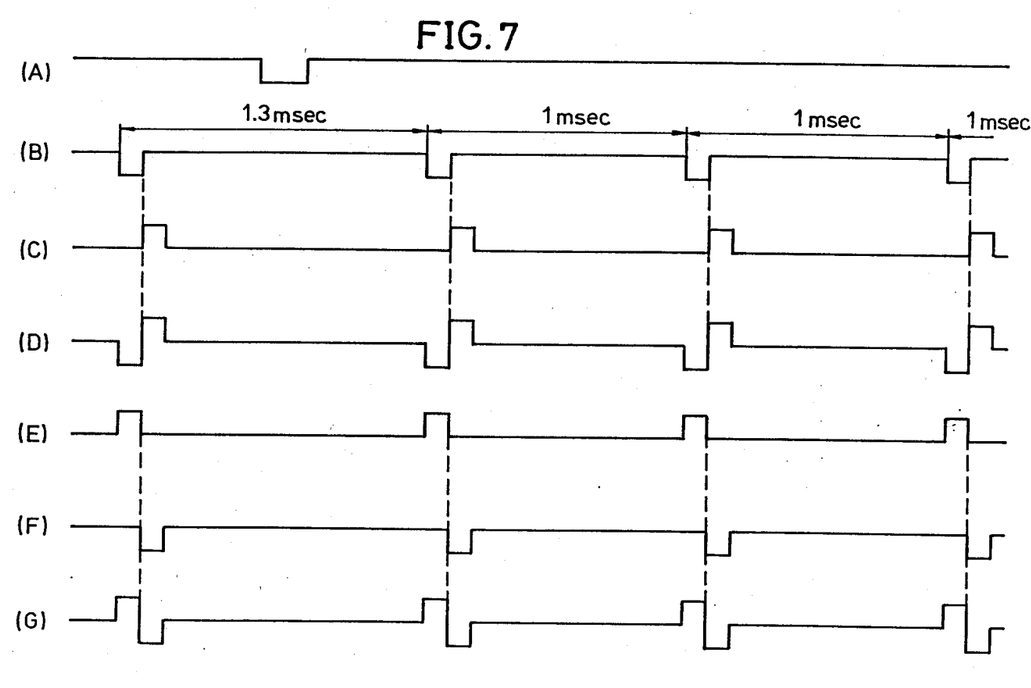
FIG. 7 is wave form diagrams showing timing of trigger pulses and jump pulses used in the apparatus of FIG. 3.

The jump pulse produced in the step 210 actually comprises a first trigger pulse having a first polarity and a second trigger pulse having a second polarity which is opposite to the first polarity. FIGS. 7(B) and (C) show an example of the first and second trigger pulses in a case that the value of the parameter DIR is one. FIG. 7(A) shows the timing of a synchronizing signal pulse corresponding to a first vertical blanking interval of a first field which constitutes one frame of a video signal. The timing of the first and second trigger pulses relative to the vertical synchronizing signal is determined in the step 206 in such a manner that the vertical synchronizing signal locates between the first and second trigger pulses which are produced for the first field and between the first and second trigger pulses which are produced for the second field. With the timing of the trigger pulses thus selected, the vertical synchronizing signal is always reproduced in the high speed reproducing operation. Thus, the vertical synchronization of the reproduced video signal is maintained even in such a case of high speed reproducing. In the present embodiment, an interval between the first jump and the second jump is chosen to be slightly longer such as 1.3 msec as compared to other intervals which are selected for example to be 1 msec in order to positively reproduce the vertical synchronizing signal at the interval between the first jump and the second jump. It should be noted, however, that the interval between the jumps may be selected to be 1 msec, for example, throughout the entire jumps. It is preferred to choose the interval between the jumps as small as possible so long as a mechanical response of a mirror driving system including the actuator can follow. In other words, it is preferred to carry out all of the jumps in a confined time interval including the vertical blanking interval. The first and second trigger pulses thus produced by the CPU 40 in the step 210 is supplied to lines 100 and 101 connected to the jump circuit 27 from the system controller 4 through the bus 41, I/O device 49 and servo controller 55.

The jump circuit 27 combines the first and second trigger pulses on the lines 100 and 101 and produces for example a bipolar jump pulse as shown in FIG. 7(D). The jump pulse produced as such is supplied to the driver 26 which produces the tracking error signal, and the tracking error signal supplied to the actuator of the optical base 9 causes the jumps of the reproducing light beam across the track by one track pitch. The operation comprising the steps 206, 207, 208, 209 and 210 is repeated until the jump of the light beams is repeated $m_x$ times.

FIGS. 7(E) and (F) show the first and second trigger pulses in the case that the parameter DIR is zero. As can be seen in the drawing, the first and second trigger pulses have opposing polarities to those of the first and second trigger pulses in FIGS. 7(B) and (C). The jump pulse shown in FIG. 7(G) also has a polarity which is opposite to that of the jump pulse in FIG. 7(D). Thus, the timing of the trigger pulses and the jump pulses, produced in the case of the parameter DIR is zero, is identical to those of the corresponding pulses in the case that the parameter DIR equals to one. However, the direction the reproducing light beam is moved is opposite in the case that the parameter DIR is one and zero. Other operations are identical in the two cases and the description thereof will be omitted.

It should be noted that FIGS. 7(A)-(G) show the relationship of the timing of the vertical synchronizing signal to the jump pulse for the first field constituting half of the single frame picture. The CPU 40, after producing one or a plurality of jump pulses in the confined time interval including the vertical blanking interval as described, further produces jump pulses one or a plurality of times in a confined time interval including a second vertical blanking interval which corresponds to the second field constituting the remaining half of the single frame picture. The total number of times the reproducing light beam jumps in the first and second fields corresponds to the number of jumps $m_x$ stored in the ROM 44. The timing of the jump in the first and second fields is such that a jump in the first field and a corresponding jump in the second field is made with an identical timing relative to the respective vertical synchronizing signals. As a result, the position of a horizontal noise band appearing on the screen due to the jump becomes identical in the first and second fields except for those portions in which no corresponding jump is made in one of the fields. Thus, a deterioration of the quality of the picture caused by the noise bars appearing in different positions on the screen in the first and second fields is reduced as the area on the screen occupied by the noise bands is reduced.

It should be noted that the number of jumps corresponding to a particular reproducing speed is different in the forward reproducing mode and the backward reproducing mode. For example, the number of jumps required to achieve a forward high speed reproducing operation which reproduces the video signal ten times faster than the normal reproducing speed is nine in total, in which the reproducing beam jumps five times consecutively from an inner first track of the disc to an outer second track in the first field and then jumps four times consecutively from the second track to a third track located further out from the second track as will be described later with reference to FIG. 8(A). On the contrary, when reproducing the video signal ten times faster than the normal reproducing speed in the backward direction, the reproducing light beam jumps eleven times in all, in which first consecutive jumps of the reproducing beam are made five times from an outer first track to an inner second track in the first field, and then second consecutive jumps are made six times from the second track to a third track located on the inner side of the second track in the second field as will be described later with reference to FIG. 8(B).

Figure 8A:
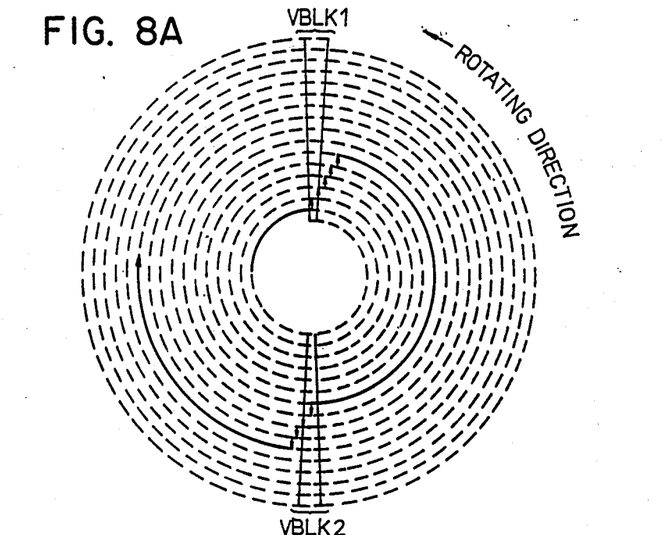
FIGS. 8(A) and (B) are schematic plan views of a disc showing a track of the reproducing means in FIG. 1 during a high speed reproducing operation.
Figure 8B:
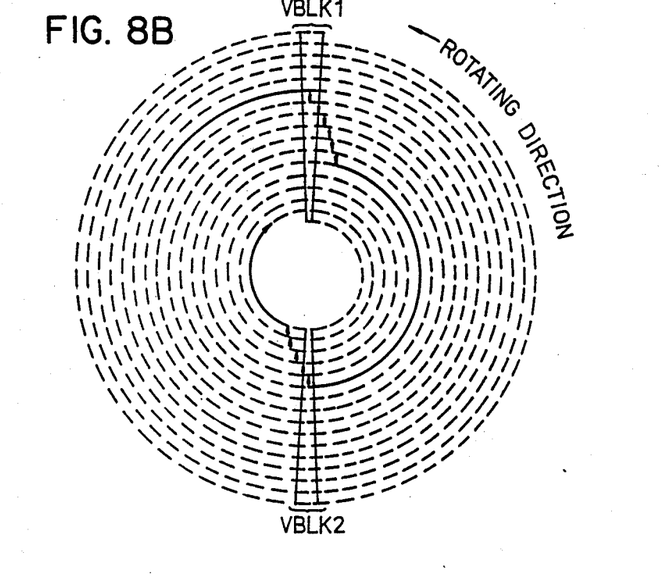

FIGS. 8(A) and (B) show respectively an example of a scanning pattern of the reproducing light beam scanning the disc, when reproducing the video signal ten times faster, in the forward direction and backward direction. In the drawing, a phantom line indicates a center line of the track of the disc along which the video signal is recorded. The areas designated as VBLK1 and VBLK2 indicate respectively the first and second vertical blanking interval recording regions formed on a CAV (constant angular velocity) disc rotated with a constant angular velocity.

FIG. 8(A) shows the scanning pattern of the reproducing light beam scanning on the disc when reproducing the video signal ten times faster in the forward direction. In this example, the reproducing light beam is moved nine times in one revolution of the disc across the track one track pitch by one track pitch similar to the case of the normal reproducing operation mode. The jump of the reproducing light beam is made at first five times consecutively in a first time interval confined to the first vertical blanking interval corresponding to the region VBLK1 with an interval of 1 msec for example in such a manner that the vertical synchronizing signal is reproduced between the jumps. Then, the reproducing light beam is jumped again four times consecutively in a second time interval confined to the second vertical blanking interval corresponding to the region VBLK2 in a similar manner such that the vertical synchronizing signal is reproduced between the jumps. As a result, the reproducing light beam scans the disc along the scanning pattern as shown in FIG. 8(A).

The noise band caused by the one track pitch jump aforementioned appears on the screen as a horizontal band having a width corresponding to one to ten odds of H. According to the present invention, the position of the noise band on the screen is confined to a relatively narrow region including the vertical blanking interval. Taking into account the effect of overscanning of a cathode ray tube constituting the screen, two out of five noise bands, for example, produced as a result of the jumps of the reproducing light beam in the vicinity of the first vertical blanking interval recording region VBLK1 can be eliminated from the screen. Similarly, two out of four noise bands produced as a result of the jumps of the reproducing light beam in the vicinity of the second vertical blanking interval recording region VBLK2 can be eliminated from the screen.

Further, the remaining noise bands on the screen appear at an upper or lower end of the screen where the quality of video information displayed is relatively unimportant. Furthermore, the noise bands produced in the first field and the second field appear on the screen at generally corresponding positions. Thus, the noise bands appear stationary in the screen and the deteriorative effect due to the noise band is minimized.

FIG. 8(B) shows the scanning pattern on the disc of the reproducing light beam when reproducing the video signal ten times faster in the backward direction.

In this example, the reproducing light beam is moved nine times in one rotation of the disc across the track one track pitch by one track pitch toward a direction from the outer periphery of the disc toward the inner periphery of the disc opposite to the case of normal reproducing operation mode. The jump of the reproducing light beam is made at first six times consecutively in a first time interval confined to the first vertical blanking interval recording region VBLK1 with an interval of 1 msec for example in such a manner that the vertical synchronizing signal is reproduced between the jumps. Then, the reproducing light beam is jumped again five times consecutively in a time interval confined to the second vertical blanking interval recording region VBLK2 in a similar manner such that the vertical synchronizing signal is reproduced between the jumps. As a result, the reproducing light beam scans the disc along the scanning pattern as shown in FIG. 8(B).

In this high speed reproducing operation mode reproducing the video signal ten times faster than the normal reproducing speed in the reversed direction, four noise bands appear on the screen in the first field and three noise bands appear on the screen in the second field. These noise bands, however, appear stationary on the screen and occupy only the upper or lower end of the screen. Thus, the deteriorative effect to the picture quality due to the noise band is minimized.

The present invention is also applicable to reproducing speeds other than those described heretofore in which the number of jumps of the reproducing light beam in one revolution of the disc may be more than five. In other words, the number of jumps in one revolution of the disc may be more than six in the forward reproducing direction and may be more than four in the backward reproducing direction.

The present invention is also applicable to a disc in which more than three fields are recorded in one rotation of the disc.

Furthermore, as the present invention is not limited to these embodiments, but variations and modifications may be made without departing from the scope of the present invention.

What is claimed is:

1. A method of reproducing a video signal containing a vertical blanking interval recorded on a rotary recording medium at a high reproducing speed by moving reproducing means for reproducing the signal across a track on the rotary recording medium along which the signal is recorded one track pitch by one track pitch one or a plurality of times responsive to a data stored in memory means indicating a number of times the reproducing means is to be moved across the track during one revolution of the rotary recording medium, said reproducing means being moved responsive to a driving signal, said method comprising the steps of:

storing a relation between a desired high reproducing speed and the corresponding number of times the reproducing means is to be moved across the track one track pitch by one track pitch in the memory means in a form of a table;

reading out the number of times the reproducing means is to be moved across the track one track pitch by one track pitch from said memory means responsive to a high speed reproducing command signal commanding the desired high reproducing speed and a desired reproducing direction;

discriminating the desired reproducing direction responsive to the high speed reproducing command signal whether the desired reproducing direction is a forward direction or a backward direction;

determining a timing of the driving signal to be produced responsive to the desired high reproducing speed and direction; and producing the driving signal according to said timing for a plurality of times in correspondence with said number of times the reproducing means is to be moved to cause desired movement of the reproducing means which provides said desired reproducing speed in said desired reproducing direction, wherein said step of determining the timing determines the timing of said plurality of driving signals such that the driving signals are produced in a relatively confined time interval including the vertical blanking interval with a timing that a vertical synchronizing signal is included between a first driving signal and a second driving signal produced subsequently to the first driving signal, and said interval between the first and second driving signals is set longer than those corresponding intervals between the driving signals produced subsequently to the first driving signal.

2. A method as claimed in claim 1 in which said plurality of driving signals are produced in first and second time intervals relatively confined and respectively containing first and second vertical blanking intervals which corresponds to a first and second fields of a reproduced one frame picture reproduced at the desired high reproducing speed in such a manner that a predetermined number of pulses are produced in the first and second time intervals respectively in response to the desired reproducing speed and the desired reproducing direction, wherein a total number of said driving signals in the first and second time intervals being equal to the number of times the reproducing means is moved across the track one track pitch by one track pitch as read out from said memory means.

3. A method as claimed in claim 2 in which said plurality of driving signals produced in the first and second time intervals are produced with such a timing that a timing of a driving signals produced in said first time interval relative to a first vertical synchronizing signal in the first vertical blanking interval corresponds to a timing of a corresponding driving signal produced in said second time interval relative to a second vertical synchronizing signal in the second vertical blanking interval.

* * * * *